(12) United States Patent  
Elwell

(10) Patent No.: US 8,848,486 B1  
(45) Date of Patent: Sep. 30, 2014

(54) ULTRASONIC TRANSMITTER HAVING ADJUSTABLE OUTPUT

(75) Inventor: Brian E. Elwell, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 809 days.

(21) Appl. No.: 13/107,141

(22) Filed: May 13, 2011

(51) Int. Cl.  
*G01S 1/72* (2006.01)  
*H04B 1/02* (2006.01)

(52) U.S. Cl.  
USPC .......................................... 367/117; 367/137

(58) Field of Classification Search  
CPC ........ G01S 11/14; H03F 1/0222; H03G 3/004  
USPC .......................................... 367/94, 117, 137  
See application file for complete search history.

(56) References Cited

U.S. PATENT DOCUMENTS 4,234,942 A * 11/1980 Prause et al. ................... 367/128  
2013/0229228 A1 * 9/2013 Drogi ............................. 330/127

* cited by examiner

*Primary Examiner* — Steven Lim  
*Assistant Examiner* — Omeed Alizada  
(74) *Attorney, Agent, or Firm* — King & Spalding LLP

(57) ABSTRACT

An ultrasonic transmitter of an ultrasonic occupancy sensing device has adjustable ultrasonic signal output amplitude to prevent overload of an ultrasonic sensor associated with the ultrasonic occupancy sensing device. A circuit for controlling the operating voltage to a power driver of the ultrasonic transmitter allows field adjustment of the output thereof so that an optimal level (amplitude) for the transmitted ultrasonic signal may be found in an area of actual use (e.g., field adjustable).

19 Claims, 4 Drawing Sheets

ULTRASONIC TRANSMITTER HAVING ADJUSTABLE OUTPUT

TECHNICAL FIELD

The present invention relates generally to ultrasonic occupancy sensing, and more particularly, to controlling the output of an ultrasonic transmitter used in an ultrasonic occupancy sensing device.

BACKGROUND

Ultrasonic occupancy sensing devices are used to detect the presence of moving objects such as a person entering an area of interest, e.g., a room, and when such movement is detected perform a function such as turning on lights in the room. The ultrasonic occupancy sensing device radiates (transmits) high frequency sound waves that are undetectable to the human ear. These sound waves bounce off surfaces, including people. Motion is detected via shifts in frequency that are detected as "Doppler shift" when receiving the reflected sound waves and comparing the frequency thereof to the transmitted sound wave frequency in a frequency mixer and then through a low pass filter.

The relative acoustic strength of the high frequency sound waves is affected by many factors including square footage of desired coverage, partitions, drapes, carpeting, furniture, potential reflection patterns, and the efficiency of the transducer converting electrical energy into acoustic energy. If adjustments in detection sensitivity are required, present technology ultrasonic occupancy sensing devices use either a potentiometer (manual) or algorithms in a microcontroller (automatic) to adjust the amplitude of the received signal. Adjusting the amplitude of the received signal is critical to avoid saturation, e.g., overload, of the receiver circuitry and to accommodate various noise sources such as heavy airflow from a supply register in the ceiling and/or wall.

As multiple ultrasonic occupancy sensing devices are added to adjacent spaces, the total amount of ultrasonic energy increases. The ultrasonic total energy can saturate the controlled areas to the point where manual adjustments become very difficult. The ultrasonic sensors have a synergistic effect that increases with the increase in acoustic energy, making adjustment of the received signal strength more and more difficult. The increase in ultrasonic signal density also makes isolating control of discreet areas very difficult and inconsistent over time as conditions change. Variations in performance are observed as the configuration of an area changes, such as differing number of perimeter doors being closed at different times.

Some ways to mitigate the aforementioned problems have been to use different types of ultrasonic occupancy sensing devices designed for specific size areas with transmitter output amplitudes appropriate for the square footage of the specific area of use. Use of ultrasonic transducers, each driven at a different ultrasonic frequency have been used so that the ultrasonic energies do not accumulate and saturate the total areas being monitored and controlled. Since frequencies and ultrasonic power outputs are not selectable, a plurality of different ultrasonic occupancy sensing devices must be used.

SUMMARY

Therefore to mitigate the aforementioned problems, it is desirable to be able to reduce the output of an ultrasonic transmitter so as not to overload the ultrasonic sensors. According to the teachings of this disclosure, a circuit for controlling the operating voltage to a power driver of the ultrasonic transmitter allows field adjustment of the output thereof so that an optimal level (amplitude) for the transmitted ultrasonic signal may be found in the area of actual use (e.g., field adjustable).

According to a specific example embodiment of this disclosure, an ultrasonic transmitter having adjustable output amplitude comprises: a carrier oscillator; a power driver having an input coupled to the carrier oscillator; an acoustic transducer coupled to the output of the power driver; and a controlled voltage supply having an adjustable voltage output coupled to the power driver, wherein an amplitude of an acoustic signal from the acoustic transducer is controlled by adjusting the voltage output from the controlled voltage supply.

According to another specific example embodiment of this disclosure, a method for adjusting output amplitude of an ultrasonic transmitter comprises the steps of: driving an acoustic transducer with a power driver; driving the power driver with a carrier oscillator; and adjusting a voltage supply having a variable voltage output coupled to the power driver, wherein an amplitude of an acoustic signal from the acoustic transducer is determined by a value of the variable voltage output from the controlled voltage supply.

According to yet another specific example embodiment of this disclosure, an ultrasonic occupancy sensing system comprises: a carrier oscillator; a power driver having an input coupled to the carrier oscillator; an acoustic transducer coupled to the output of the power driver; a controlled voltage supply having an adjustable voltage output coupled to the power driver, wherein an amplitude of an acoustic signal from the acoustic transducer is controlled by adjusting the voltage output from the controlled voltage supply; an acoustic sensor; a bandpass frequency filter coupled to the acoustic sensor; a programmable gain amplifier (PGA) having an input coupled to the bandpass frequency filter; a frequency mixer having a first input coupled to an output of the PGA and a second input coupled to the carrier oscillator; a frequency filter coupled to an output of the frequency mixer; a Doppler shift detector having an input coupled to the frequency filter; motion determining logic coupled to an output of the Doppler shift detector; a receiver sensitivity adjustment circuit coupled to the PGA for controlling gain of the PGA; and an acoustic power adjustment circuit coupled to the controlled voltage supply for controlling a voltage therefrom, whereby acoustic power output from the acoustic transducer is adjusted; wherein when a Doppler shift is detected from a difference between a signal frequency from the carrier oscillator and a received signal frequency from the acoustic sensor an external load control is actuated.

BRIEF DESCRIPTION OF THE DRAWINGS

For a more complete understanding of the present invention and the advantages thereof, reference is now made to the following description, in conjunction with the accompanying drawings briefly described as follows.

Figure 1:
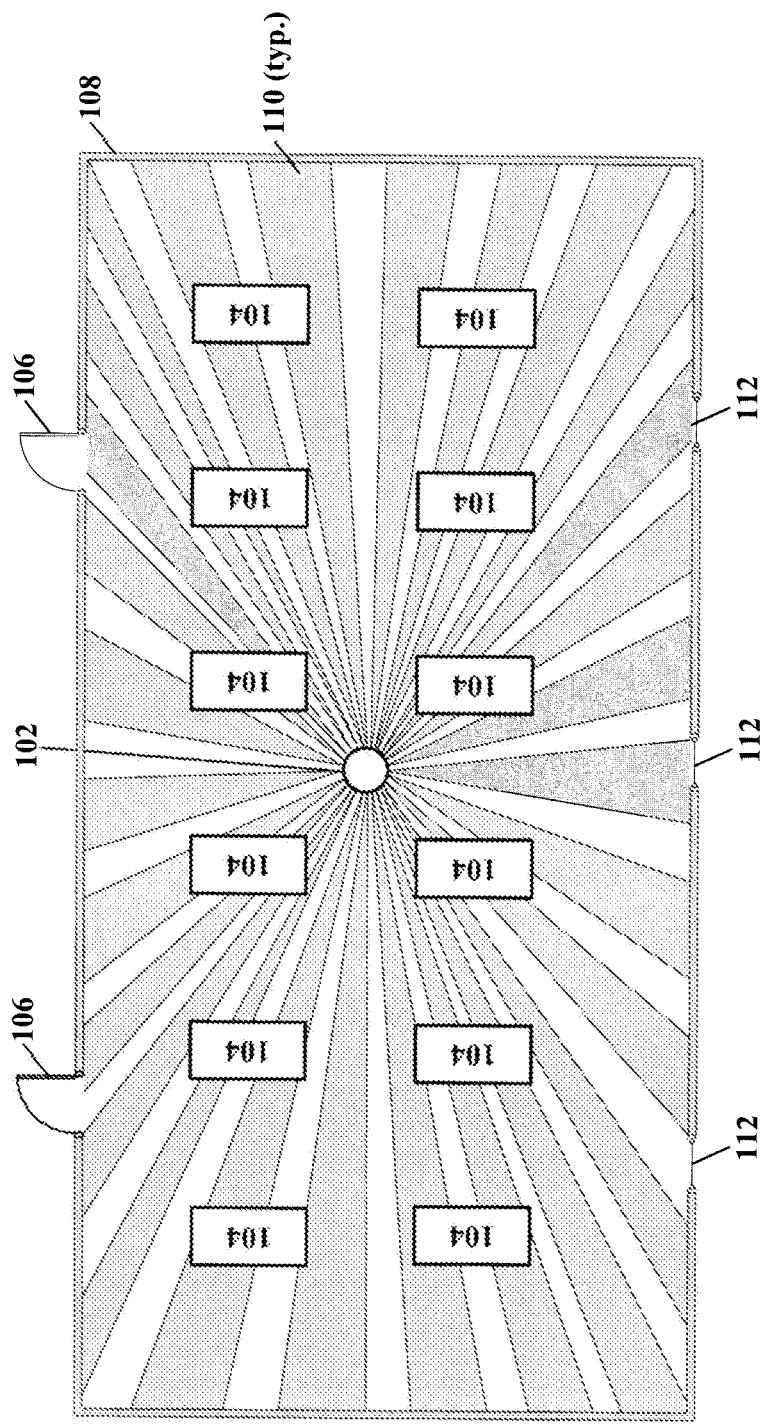
FIG. 1 illustrates a schematic plan view of an area having ultrasonic occupancy sensing devices installed for detecting motion therein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, details of example embodiments of the present invention are schematically illustrated. Like elements in the drawings will be represented by like numbers, and similar elements will be represented by like numbers with a different lower case letter suffix.

Referring to FIG. 1, depicted is a schematic plan view of an area having ultrasonic occupancy sensing devices installed for detecting motion therein. An area 108, e.g., conference room, office, closet, bathroom, etc., is shown having two access doors 106, a plurality of light fixtures 104, windows 112, and an ultrasonic occupancy sensing device 102 that transmits and receives ultrasonic acoustic waves 110. The location of the ultrasonic occupancy sensing device 102 is selected for optimum coverage and sensing of movement in the area 108, e.g., people entering and occupying the area 108.

Figure 2:
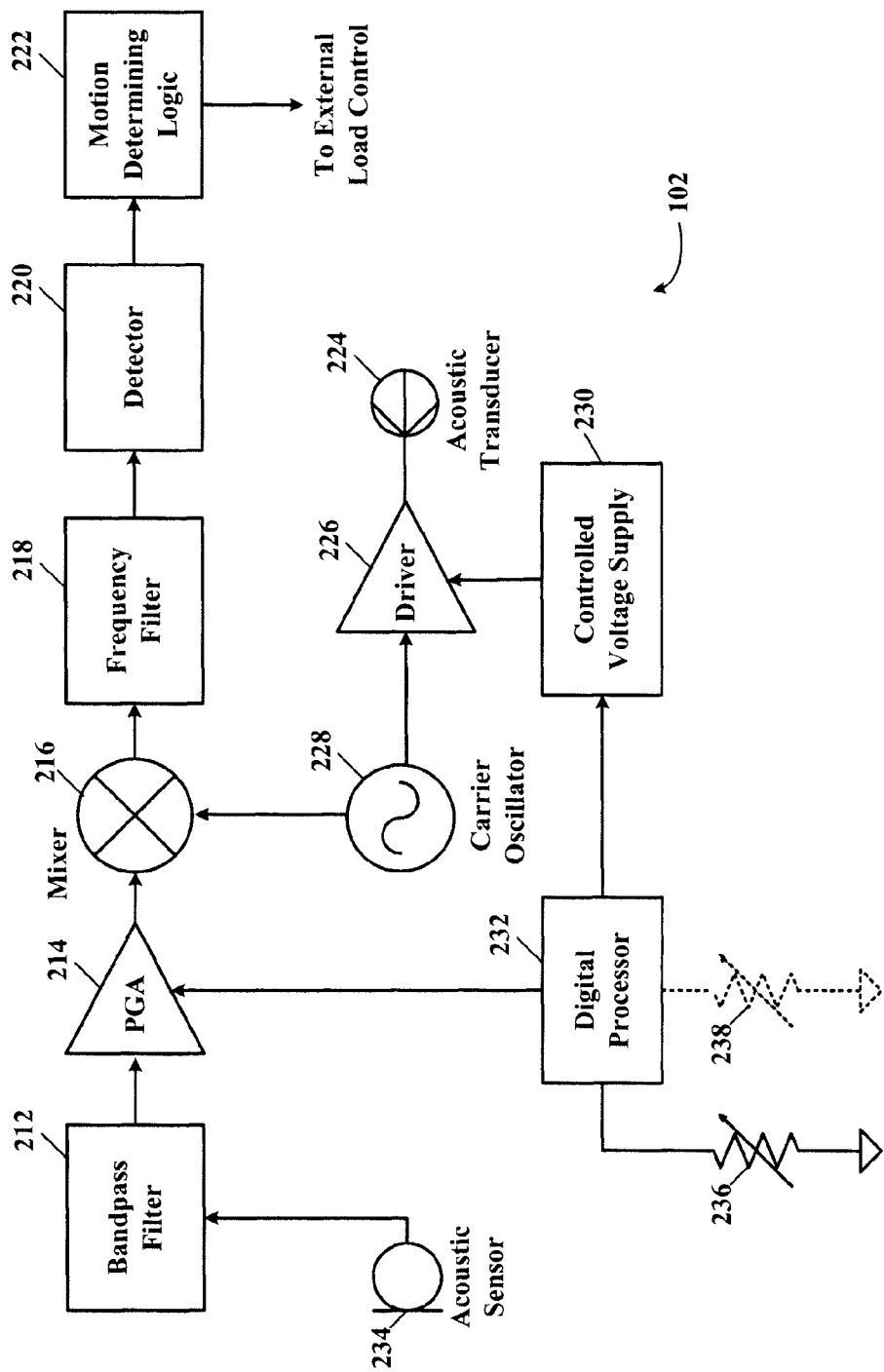
FIG. 2 illustrates a schematic block diagram of an ultrasonic occupancy sensing device as utilized in FIG. 1, according to the teachings of this disclosure.

Referring to FIG. 2, depicted is a schematic block diagram of an ultrasonic occupancy sensing device as utilized in FIG. 1, according to the teachings of this disclosure. The ultrasonic occupancy sensing device 102 comprises an acoustic sensor 234, a bandpass filter 212, a programmable gain amplifier (PGA) 214, a frequency mixer 216, a lowpass or bandpass filter 218 (hereinafter "frequency filter 218"), a Doppler shift detector 220, motion determining logic 222, an ultrasonic frequency carrier oscillator 228, a power driver 226, an acoustic transducer 224, a controlled voltage supply 230, and a digital processor 232. The acoustic transducer 224 generates the ultrasonic acoustic waves 110 at a frequency determined by the carrier oscillator 228. The power driver 226 amplifies the signal frequency from the carrier oscillator 228 sufficiently to cause the acoustic transducer 224 to generate the ultrasonic acoustic waves 110 at a desired amplitude. The controlled voltage supply 230 provides for settable control of the output from the power driver 226 to the acoustic transducer 224 so as to obtain the desired amplitude of the ultrasonic acoustic waves 110.

The acoustic sensor 234 receives the ultrasonic acoustic waves 110 (both direct and reflected) and converts them into electric signals that are applied to the bandpass filter 212. The bandpass filter 212 restricts alternating current energy therethrough to frequencies within the bandpass of the filter 212, e.g., about 1 kilohertz (kHz) bandwidth, centered at the frequency of the carrier oscillator 228, e.g., 25 to 27 kHz, 32.768 kHz, 40 kHz, etc. The gain of the PGA 214 is controlled by the digital processor 232 so as to set the receive sensitivity of the ultrasonic occupancy sensing device 102. The greater the receive sensitivity, the greater the range of motion detection, but also the greater the chance of nuisance tripping from noise sources, e.g., supply air ducts, adjacent ultrasonic occupancy sensing devices (not shown), etc.

The amplified received signal from the PGA 214 is applied to the frequency mixer 216 where it is mixed with a signal from the carrier oscillator 228. The frequency mixer 216 produces signals at the sum and difference frequencies of these two input signals and feeds them to the input of the frequency filter 218. The frequency filter 218 removes the sum frequency, generally twice the frequency of the signal from the carrier oscillator 228 and passes the difference frequency to the Doppler shift detector 220. When there is no movement in the area 108 there will be no frequency change (Doppler shift) in the reflected receive signal (generated by the ultrasonic acoustic waves 110), therefore, the difference frequency will be substantially zero (0) Hertz and the Doppler shift detector 220 will have substantially no output signal therefrom. However, when there is movement in the area 108 the reflected receive signal (generated by the ultrasonic acoustic waves 110) will be shifted in frequency and the difference frequency from the mixer 216 will be greater than zero (0) Hertz, thereby causing the Doppler shift detector 220 to generate an output signal therefrom. This output signal from the Doppler shift detector 220 is processed in the motion determining logic 222 that will generate a control signal for controlling an external load, e.g., turning on the light fixtures 104 in the area 108.

The digital processor 232 may be used to control both the gain of the PGA 214 and the voltage level to the power driver 226. A single adjustment control 236 may be used to concurrently control both the gain of the PGA 214 and the voltage level to the power driver 226 (for amplitude control of the ultrasonic acoustic waves 110) for ease and simplicity in making range adjustments in the field. Alternatively, a separate control 238 may be used for control of the voltage level to the power driver 226 thereby allowing independent control of the gain of the PGA 214 (receive sensitivity) and transmitted amplitude of the ultrasonic acoustic waves 110. The digital processor 232 may also perform the functions of the motion determining logic 222, thereby incorporating those functions into a single integrated circuit device, e.g., a mixed signal (both analog and digital) microcontroller.

Figure 3:
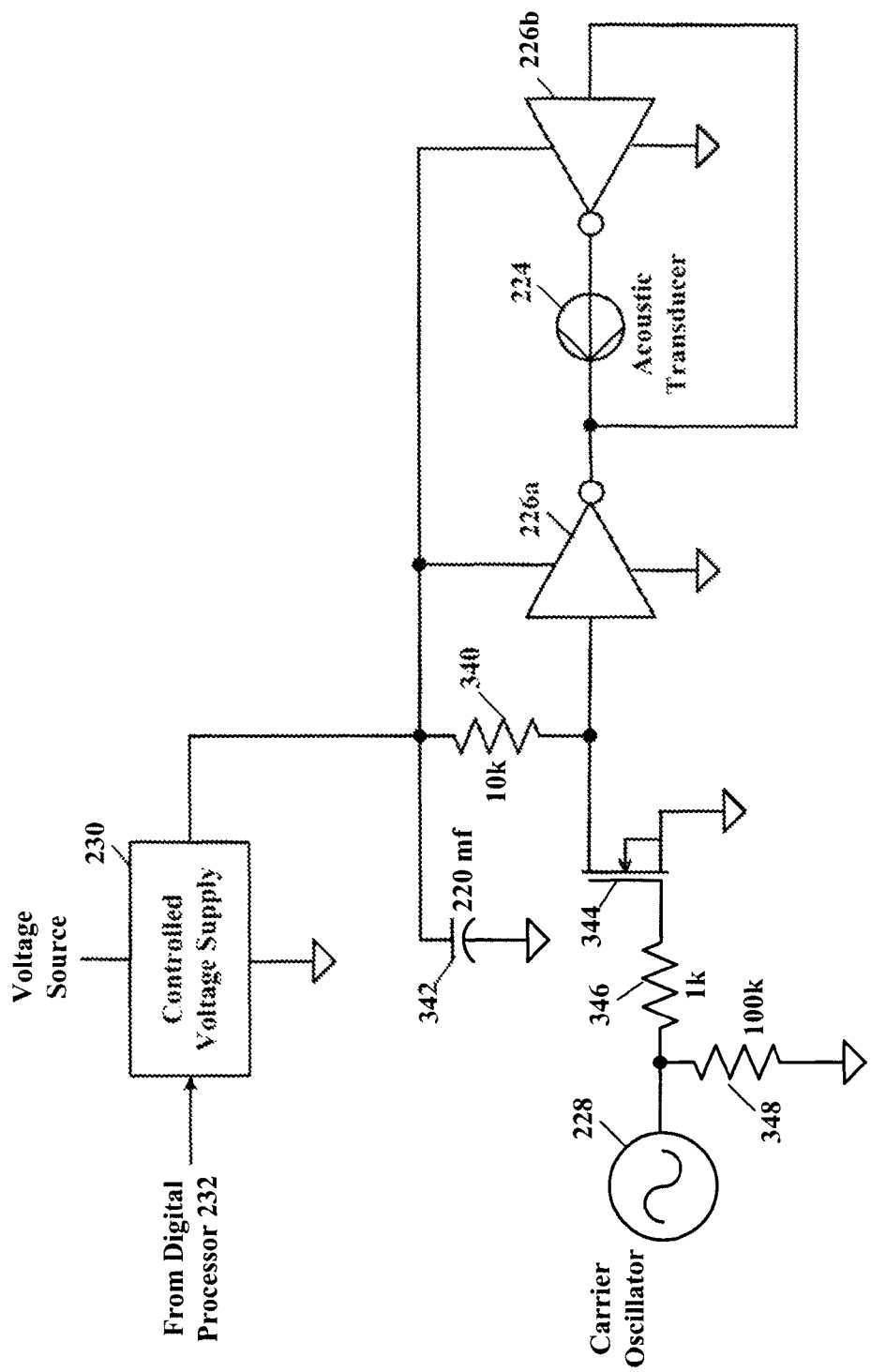
FIG. 3 illustrates a more detailed schematic diagram of an ultrasonic transducer, power driver and a voltage control circuit shown in FIG. 1, according to a specific example embodiment of this disclosure.

Referring to FIG. 3, depicted is a more detailed schematic diagram of an ultrasonic transducer, power driver and a voltage control circuit shown in FIG. 1, according to a specific example embodiment of this disclosure. The power driver 226 may comprise inverters 226a and 226b for driving the acoustic transducer 224 input terminals alternately high and low at the frequency of the carrier oscillator 228. A plurality of inverters 226a and 226b may be paralleled together for adequate drive power to the acoustic transducer 224. A transistor 344, e.g., a metal-oxide semiconductor field effect transistor (MOSFET), may be used as a buffer between the output of the carrier oscillator 228 and the inputs of the plurality of inverters 226a so as to provide a high impedance to the carrier oscillator 228 for reduced loading effect thereon. The resistors 340, 346 and 348 are used to provide proper biasing and drain pull-up for the transistor 344. A filter capacitor 342 provides direct current filtering of the voltage to the plurality of inverters 226a and 226b.

The output voltage from controlled voltage supply 230 is determined by a control signal from the digital processor 232. This control signal may be analog or digital. The value of this output voltage determines the acoustic wave amplitude from the acoustic transducer 224. The controlled voltage supply 230 reduces the voltage value of the voltage source to the lower voltage value desired for the acoustic wave amplitude, and may be any one of a number of open or even closed loop voltage regulator designs, e.g., linear and switch mode, as known to those skilled in the art of voltage regulator design. A more detailed embodiment for a controlled voltage supply 230 is described hereinafter.

Figure 4:
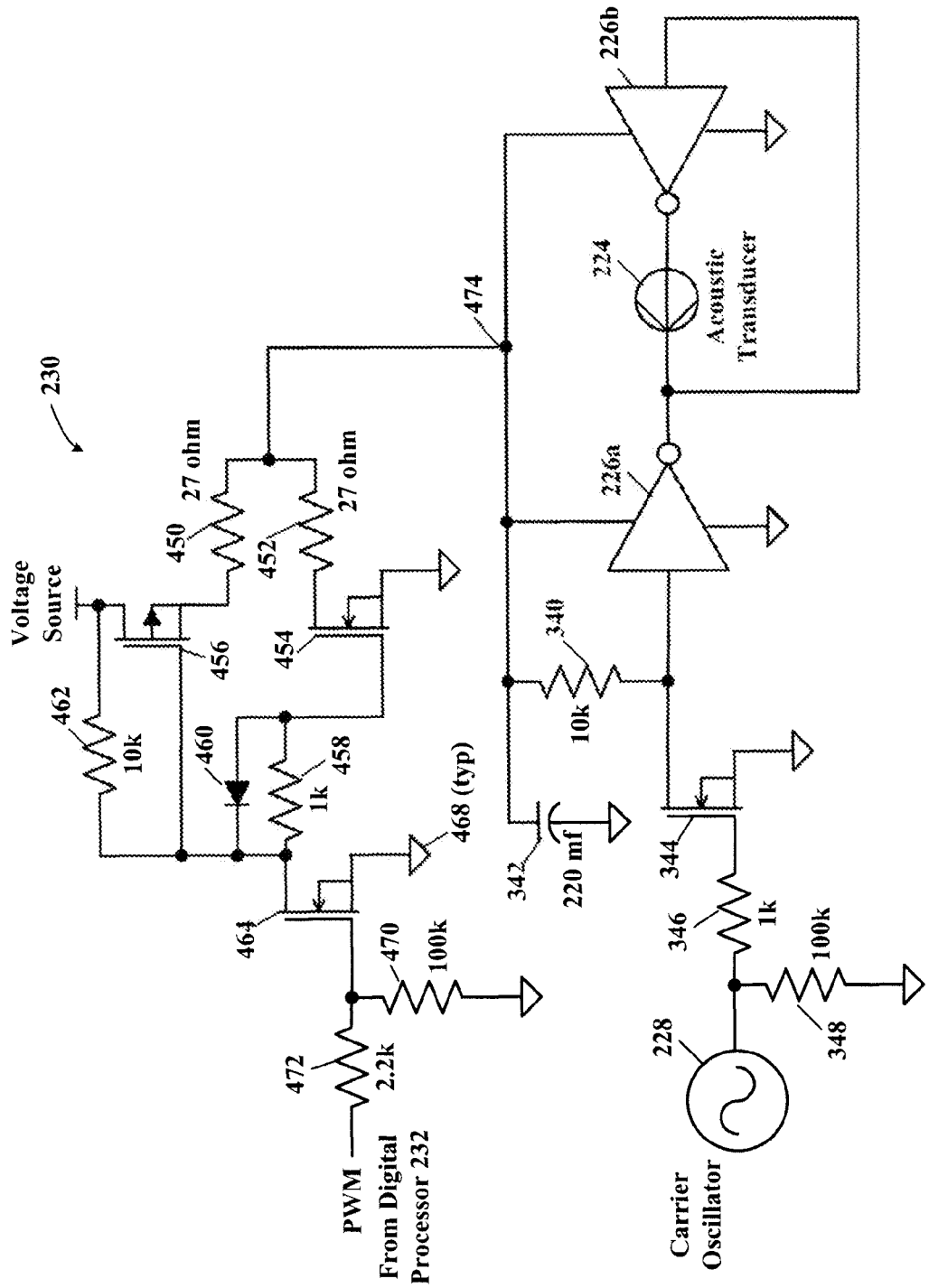
FIG. 4 illustrates a more detailed schematic diagram of an ultrasonic transducer, power driver and a voltage control circuit shown in FIG. 1, according to another specific example embodiment of this disclosure.

Referring to FIG. 4, depicted is a more detailed schematic diagram of an ultrasonic transducer, power driver and a voltage control circuit shown in FIG. 1, according to another specific example embodiment of this disclosure. The carrier oscillator 228, power driver 226 and acoustic transducer 224 function as described hereinabove. The controlled voltage supply 230 comprises switching transistors 454 and 456, driver transistor 464, diode 460, and resistors 450, 452, 458, 462, 470 and 472. The control signal from the digital processor 232 is a pulse width modulation (PWM) signal wherein the on and off duty cycle times of the PWM signal determine the average voltage at node 474 and the filter capacitor 342. The digital processor 232 may easily and inexpensively provide this digital PWM control signal. When the PWM control signal is at a logic "1" transistor 456 is on and applies voltage from the voltage source to the node 474 and the capacitor 342. Transistor 454 is off. When the PWM control signal is at a logic "0" transistor 456 is off and does not allow voltage from the voltage source to be applied to the node 474 and the capacitor 342. The voltage at node 474 depends upon the "on" times of the transistor 456.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

I claim:

1. An ultrasonic transmitter having adjustable output amplitude, comprising:
   a carrier oscillator;
   a power driver having an input coupled to the carrier oscillator, the power driver comprising a plurality of inverters;
   an acoustic transducer coupled to the output of the power driver; and
   a controlled voltage supply having an adjustable voltage output coupled to the power driver, wherein an amplitude of an acoustic signal from the acoustic transducer is controlled by adjusting the voltage output from the controlled voltage supply; and
   wherein:
      a first half of the plurality of inverters are coupled to a first electrical input of the acoustic transducer;
      a second half of the plurality of inverters are coupled to a second electrical input of the acoustic transducer; and
      whereby, when the first half of the plurality of inverters are at a first logic level, the second half of the plurality of inverters are at a second logic level and the acoustic transducer is excited in push-pull by the plurality of inverters.

2. The ultrasonic transmitter according to claim 1, wherein the first half of the plurality of inverters are coupled in parallel with each other and the second half of the plurality of inverters are coupled in parallel with each other.

3. The ultrasonic transmitter according to claim 1, further comprising a buffer amplifier between the carrier oscillator and the input of the power driver.

4. The ultrasonic transmitter according to claim 1, wherein:
   the controlled voltage supply has a pulse width modulation (PWM) input;
   the adjustable voltage output thereof comprises pulses having voltage amplitudes of substantially a voltage source with pulse width durations controlled by a PWM signal at the PWM input thereof; and
   a filter capacitor coupled to the adjustable voltage output of the controlled voltage supply for smoothing the voltage pulses therefrom into a direct current voltage to the power driver.

5. The ultrasonic transmitter according to claim 4, further comprising a digital processor supplying the PWM signal for controlling the voltage output from the controlled voltage supply.

6. The ultrasonic transmitter according to claim 4, wherein the controlled voltage supply comprises:
   a transistor amplifier having an input coupled to the PWM input thereof; and
   totem pole connected power transistors driven by the transistor amplifier and having outputs coupled to the adjustable voltage output of the controlled voltage supply.

7. The ultrasonic transmitter according to claim 1, wherein the voltage output from the controlled voltage supply is field adjustable.

8. The ultrasonic transmitter according to claim 1, wherein a signal frequency of the carrier oscillator is selected from the group consisting 25 to 27 kHz, 32.768 kHz, and 40 kHz.

9. A method for adjusting output amplitude of an ultrasonic transmitter, said method comprising the steps of:
   driving an acoustic transducer with a power driver, the power driver comprising a plurality of inverters;
   driving the power driver with a carrier oscillator; and
   adjusting a voltage supply having a variable voltage output coupled to the power driver, wherein an amplitude of an acoustic signal from the acoustic transducer is determined by a value of the variable voltage output from the controlled voltage supply,
   wherein:
      a first half of the plurality of inverters are coupled to a first electrical input of the acoustic transducer;
      a second half of the plurality of inverters are coupled to a second electrical input of the acoustic transducer; and
      whereby, when the first half of the plurality of inverters are at a first logic level, the second half of the plurality of inverters are at a second logic level and the acoustic transducer is excited in push-pull by the plurality of inverters.

10. The method according to claim 9, wherein the step of adjusting the voltage supply comprises the step of varying a duty cycle of a pulse width modulation (PWM) control signal.

11. The method according to claim 10, further comprising the step of generating the PWM control signal from a digital processor.

12. The method according to claim 9, wherein the step of adjusting the variable voltage output from the voltage supply comprises the step of field adjusting the variable voltage output from the voltage supply.

13. An ultrasonic occupancy sensing system, said system comprising:
   a carrier oscillator;
   a power driver having an input coupled to the carrier oscillator;

an acoustic transducer coupled to the output of the power driver;

a controlled voltage supply having an adjustable voltage output coupled to the power driver, wherein an amplitude of an acoustic signal from the acoustic transducer is controlled by adjusting the voltage output from the controlled voltage supply;

an acoustic sensor;

a bandpass frequency filter coupled to the acoustic sensor;

a programmable gain amplifier (PGA) having an input coupled to the bandpass frequency filter;

a frequency mixer having a first input coupled to an output of the PGA and a second input coupled to the carrier oscillator;

a frequency filter coupled to an output of the frequency mixer;

a Doppler shift detector having an input coupled to the frequency filter;

motion determining logic coupled to an output of the Doppler shift detector;

a receiver sensitivity adjustment circuit coupled to the PGA for controlling gain of the PGA; and an acoustic power adjustment circuit coupled to the controlled voltage supply for controlling a voltage therefrom, whereby acoustic power output from the acoustic transducer is adjusted;

wherein when a Doppler shift is detected from a difference between a signal frequency from the carrier oscillator and a received signal frequency from the acoustic sensor an external load control is actuated.

14. The system according to claim 13, wherein the receiver sensitivity adjustment circuit and the acoustic power adjustment circuit have a single field adjustment control that provides for concurrent receiver sensitivity and acoustic power output control.

15. The system according to claim 13, wherein the receiver sensitivity adjustment circuit and the acoustic power adjustment circuit have separate and independent field adjustment controls.

16. The system according to claim 13, wherein:
the controlled voltage supply has a pulse width modulation (PWM) input;
the adjustable voltage output thereof comprises pulses having voltage amplitudes of substantially a voltage source with pulse width durations controlled by a PWM signal at the PWM input thereof; and
a filter capacitor coupled to the adjustable voltage output of the controlled voltage supply for smoothing the voltage pulses therefrom into a direct current voltage to the power driver.

17. The system according to claim 13, further comprising a digital processor supplying the PWM signal for controlling the voltage output from the controlled voltage supply.

18. The system according to claim 13, wherein the signal frequency from the carrier oscillator is selected from the group consisting 25 to 27 kHz, 32.768 kHz, and 40 kHz.

19. The system according to claim 13, wherein the frequency filter is selected from the group consisting of a lowpass filter and a bandpass filter.

\* \* \* \* \*